(12) United States Patent
Komatsu

(10) Patent No.: US 11,863,725 B2
(45) Date of Patent: Jan. 2, 2024

(54) IMAGE READING DEVICE, IMAGE READING CONTROL METHOD, AND RECORDING MEDIUM STORING IMAGE READING CONTROL PROGRAM

(71) Applicant: NEC Platforms, Ltd., Kanagawa (JP)

(72) Inventor: Satoshi Komatsu, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 17/783,082

(22) PCT Filed: Nov. 26, 2020

(86) PCT No.: PCT/JP2020/043968
§ 371 (c)(1),
(2) Date: Jun. 7, 2022

(87) PCT Pub. No.: WO2021/131475
PCT Pub. Date: Jul. 1, 2021

(65) Prior Publication Data
US 2023/0018657 A1    Jan. 19, 2023

(30) Foreign Application Priority Data

Dec. 26, 2019   (JP) ................................. 2019-235443

(51) Int. Cl.
*H04N 1/401*     (2006.01)
*H04N 1/028*     (2006.01)
*H04N 1/00*      (2006.01)

(52) U.S. Cl.
CPC ......... *H04N 1/401* (2013.01); *H04N 1/00013* (2013.01); *H04N 1/00068* (2013.01); *H04N 1/02815* (2013.01)

(58) Field of Classification Search
CPC .. G06T 1/00; H04N 1/00013; H04N 1/00068; H04N 1/02815; H04N 1/401; H04N 1/04;
(Continued)

(56) References Cited

U.S. PATENT DOCUMENTS 4,639,608 A * 1/1987 Kuroda .............. H04N 1/40056
358/475
10,616,428 B2 * 4/2020 Shimizu ............. H04N 1/00005
(Continued)

FOREIGN PATENT DOCUMENTS

CN      106664364 A     5/2017
CN      110392176 A    10/2019
(Continued)

OTHER PUBLICATIONS

International Search Report for PCT Application No. PCT/JP2020/043968, dated Feb. 16, 2021.
(Continued)

*Primary Examiner* — Negussie Worku

(57) ABSTRACT

An image reading device that efficiently performs shading correction that flexibly responds to changes in the diffusion properties of reflected light on the surface of a reading target efficiently performing same as a result of including: controlling a plurality of light sources so as to cause only a specific light source among the light sources to be lit; obtaining the diffusion state of a first reflected light generated by the specific light source being lit, in a state in which general shading correction data not dependent on the image reading target is generated; obtaining a diffusion state for a second reflected light generated by light being irradiated on to the reading target by the specific light source; and generating dedicated shading correction data that relies on the reading target, based on the first reflected light diffusion state, the second reflected light diffusion state, and the general shading correction data.

8 Claims, 10 Drawing Sheets

(58) Field of Classification Search
CPC ....... H04N 1/4076; C07F 9/103; A61Q 19/00;
A61K 2300/00; A61K 31/11; A61K
45/06; A61K 47/14; A61K 47/24; A61K
8/14; A61K 9/127; A01P 1/00; A01P
7/04; A01N 25/04; A01N 25/30; A01N
27/00; A01N 3/00; A01N 31/02; A01N
35/02; A01N 37/14; A01N 57/12; A01N
63/10; A01N 65/00; A01N 65/08; A01N
65/10; A01N 65/12; A01N 65/22; A01N
65/24; A01N 65/28
USPC .................................................. 358/475, 509
See application file for complete search history.

(56) References Cited

U.S. PATENT DOCUMENTS

| | | | | |
|---|---|---|---|---|
| 2002/0003908 | A1* | 1/2002 | Kijima | G06T 5/008 |
| | | | | 358/461 |
| 2008/0074515 | A1* | 3/2008 | Takane | H04N 25/61 |
| | | | | 348/251 |
| 2009/0207450 | A1* | 8/2009 | Nagamochi | G01D 5/34746 |
| | | | | 358/2.1 |
| 2010/0171145 | A1* | 7/2010 | Morgan | H05B 45/50 |
| | | | | 257/E33.056 |
| 2010/0192216 | A1* | 7/2010 | Komatsu | H04L 63/0209 |
| | | | | 726/12 |
| 2010/0296135 | A1* | 11/2010 | Tanaka | H04N 1/00734 |
| | | | | 358/475 |
| 2017/0318188 | A1* | 11/2017 | Okada | H04N 1/02845 |
| 2017/0331968 | A1* | 11/2017 | Togashi | H04N 1/00774 |
| 2019/0281179 | A1* | 9/2019 | Hosogoshi | H04N 1/00997 |
| 2019/0320089 | A1* | 10/2019 | Yoshizawa | H04N 1/401 |
| 2021/0306496 | A1* | 9/2021 | Sunako | H04N 1/40056 |
| 2022/0377201 | A1* | 11/2022 | Seo | H04N 1/00795 |

FOREIGN PATENT DOCUMENTS

| | | |
|---|---|---|
| JP | H09-200456 A | 7/1997 |
| JP | 2001-148767 A | 5/2001 |
| JP | 2006-119805 A | 5/2006 |
| JP | 2010-135920 A | 6/2010 |
| JP | 2010-183425 A | 8/2010 |
| JP | 2011-234246 A | 11/2011 |
| JP | 2016-075608 A | 5/2016 |
| JP | 2017-118193 A | 6/2017 |
| JP | 2018-046480 A | 3/2018 |

OTHER PUBLICATIONS

English translation of Written opinion for PCT Application No. PCT/JP2020/043968, dated Feb. 16, 2021.
JP Office Action for JP Application No. 2019-235443, dated Feb. 9, 2021.
JP Office Communication for JP Application No. 2019-235443, dated Aug. 31, 2021.
CN Office Action for CN Application No. 202080086260.9, dated Sep. 27, 2023 with English Translation.

* cited by examiner

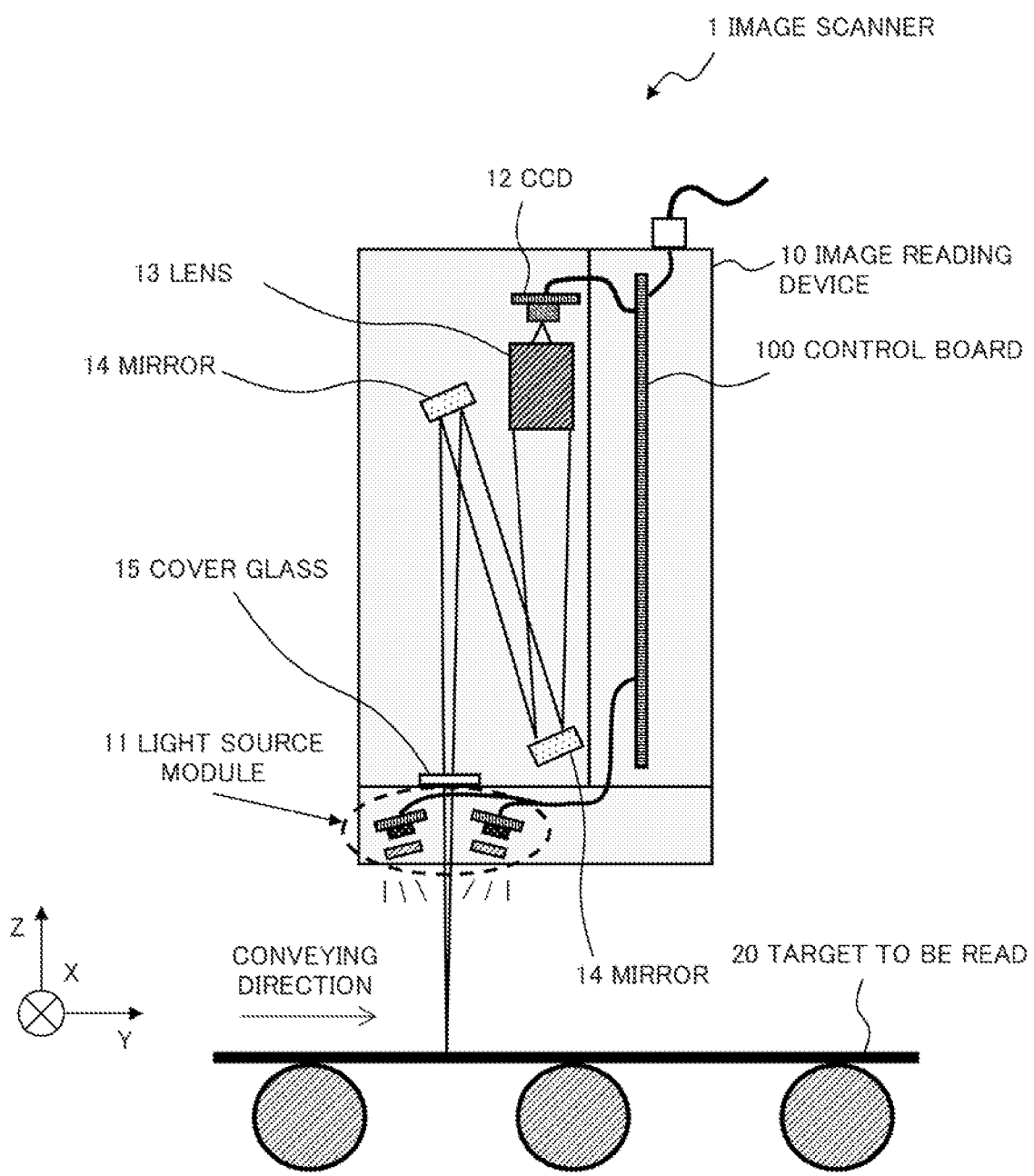

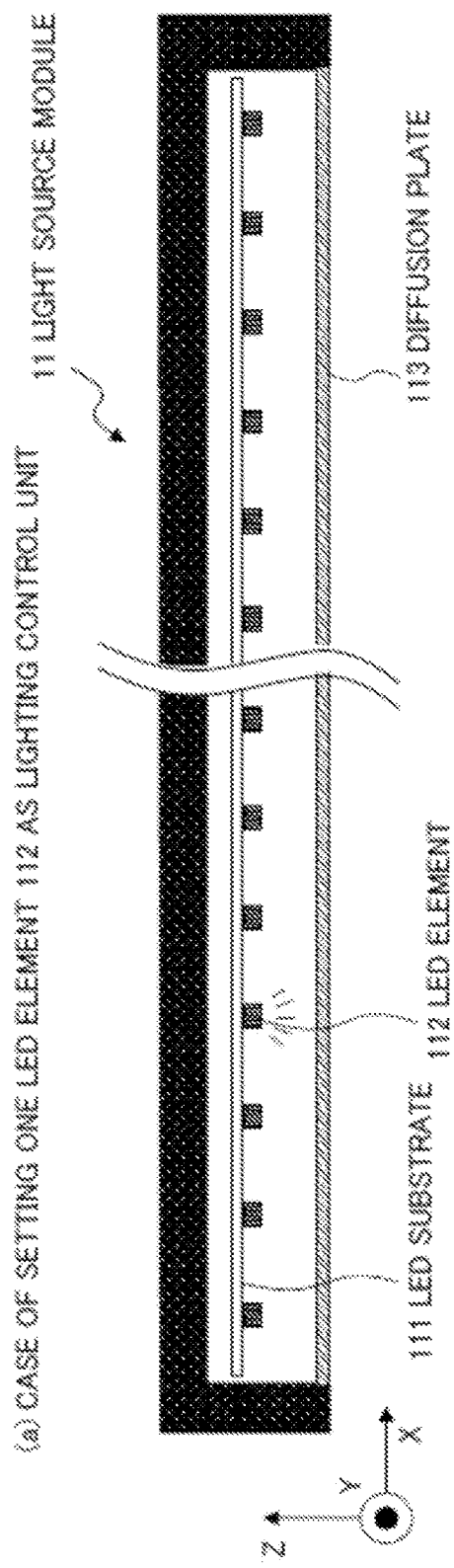
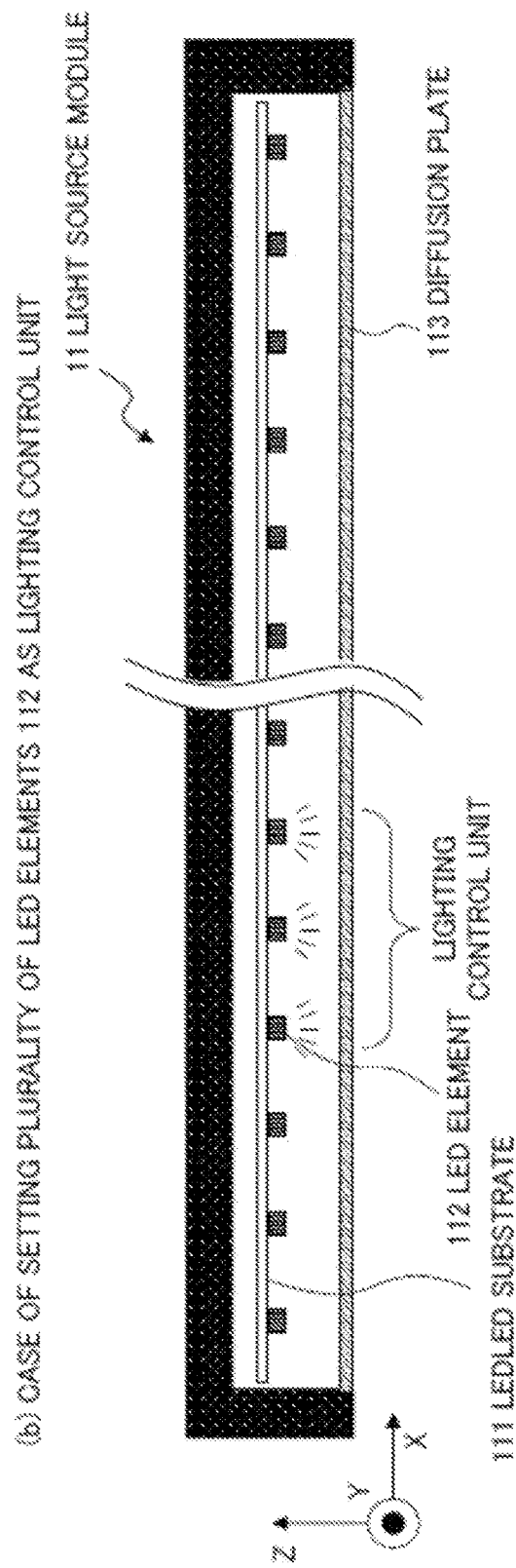

(a) READ IMAGE WHEN SHADING CORRECTION IS NOT PERFORMED (b) READ IMAGE WHEN SHADING CORRECTION IS PERFORMED

IMAGE READING DEVICE, IMAGE READING CONTROL METHOD, AND RECORDING MEDIUM STORING IMAGE READING CONTROL PROGRAM

This application is a National Stage Entry of PCT/JP2020/043968 filed on Nov. 26, 2020, which claims priority from Japanese Patent Application 2019-235443 filed on Dec. 26, 2019, the contents of all of which are incorporated herein by reference, in their entirety.

TECHNICAL FIELD

The invention of the present application relates to a technique for performing shading correction in image reading.

BACKGROUND ART

For example, an image reading device including a light source (illumination), a lens, an image sensor, and the like, such as an image scanner, has a problem that a luminance value in a read image becomes non-uniform due to variation in light amount for each light emitting diode (LED) element constituting the light source, variation in sensitivity for each pixel of the image sensor, or the like. Therefore, a general image reading device performs shading correction to solve such a problem. As illustrated in FIGS. 10A and 10B, the non-uniformity of the luminance value in the read image is eliminated by performing the shading correction.

A general image reading device includes, for example, a standard reflection plate (white reference plate, black reference plate, etc.), and acquires shading correction data to be used for the shading correction, using the standard reflection plate, each time an image is read, at the time of power on, or at predetermined time intervals. Then, expectations for a technique for appropriately and efficiently performing such shading correction are increasing.

As a technique related to such a technique, PTL 1 discloses a shading correction device that performs shading correction processing for a captured image of a plate to be inspected read by a line sensor. This device calculates a shading correction coefficient in advance using a reference density plate. The device converts a luminance value from the shading correction coefficient, compares the intensity of shading of the converted luminance value with the intensity of shading of the luminance value of the captured image from the plate to be inspected, and corrects the shading correction coefficient so that the intensities become close to each other. Then, the device corrects shading in the captured image from the plate to be inspected using the corrected shading correction coefficient.

Further, PTL 2 discloses an image reading device that captures an image of a document and outputs first light amount data indicating the image, captures a first area of a white reference member, the first area being in contact with the document, before capturing the image, and outputs second light amount data corresponding to the first area. Before capturing the image, this device captures an image of a second area of the white reference member, the second area being not in contact with the document, and outputs third light amount data corresponding to the second area. The device selects one of the second light amount data and the third light amount data as white reference data on the basis of the second light amount data, and corrects the first light amount data based on the white reference data.

In addition, PTL 3 discloses an inspection device capable of illuminating an object to be inspected by switching a plurality of different illumination conditions. The device stores image data of the illuminated object to be inspected and a plurality of shading correction data for calibrating at least one of an imaging means or the image data corresponding to the plurality of illumination conditions. Then, the device calibrates at least one of the imaging means or the image data by switching the plurality of shading correction data in response to switching of the illumination condition at the time of imaging. Then, the device inspects the object to be inspected on the basis of the calibrated image data.

CITATION LIST

Patent Literature

[PTL 1] JP 2006-119805 A
[PTL 2] JP 2017-118193 A
[PTL 3] JP 2016-075608 A

SUMMARY OF INVENTION

Technical Problem

Along with enlargement of an area where an image reading device is introduced, a cloth material, a glossy metal plate, or the like is used in addition to paper as a material of a target to be read for an image. Since the material such as a cloth material or a metal plate greatly differs from paper in diffusion characteristics of reflected light on a surface thereof, it is difficult to appropriately perform shading correction by a general shading correction method. That is, in a case where various materials are used as the material of the target to be read for an image, there is a problem of efficiently performing shading correction that flexibly copes with variations in the diffusion characteristics of reflected light on the surface of the target to be read. The techniques disclosed in PTLs 1 to 3 cannot be said to be sufficient to solve this problem.

A main object of the invention of the present application is to efficiently perform shading correction flexibly corresponding to variations in diffusion characteristics of reflected light on a surface of a target to be read when reading an image from the target to be read.

Solution to Problem

An image reading device according to an aspect of the invention of the present application includes: a light source control means configured to control a plurality of light sources in such a way as to turn on only a specific light source among the plurality of light sources; a first acquisition means configured to acquire a diffusion state of a first reflected light generated by the turning on of the specific light source in a state where general shading correction data not dependent on a target to be read for an image is generated; a second acquisition means configured to acquire a diffusion state of a second reflected light generated by the specific light source irradiating the target to be read with light; and a generation means configured to generate dedicated shading correction data dependent on the target to be read based on the diffusion state of the first reflected light, the diffusion state of the second reflected light, and the general shading correction data.

In another viewpoint for achieving the above object, an image reading control method according to one aspect of the invention of the present application includes: by an information processing device, controlling a plurality of light sources in such a way as to turn on only a specific light source among the plurality of light sources; acquiring a diffusion state of a first reflected light generated by the turning on of the specific light source in a state where general shading correction data not dependent on a target to be read for an image is generated; acquiring a diffusion state of a second reflected light generated by the specific light source irradiating the target to be read with light; and generating dedicated shading correction data dependent on the target to be read based on the diffusion state of the first reflected light, the diffusion state of the second reflected light, and the general shading correction data.

Furthermore, in another viewpoint for achieving the above object, an image reading control program according to one aspect of the invention of the present application causes a computer to execute: light source control processing of controlling a plurality of light sources in such a way as to turn on only a specific light source among the plurality of light sources; first acquisition processing of acquiring a diffusion state of a first reflected light generated by the turning on of the specific light source in a state where general shading correction data not dependent on a target to be read for an image is generated; second acquisition processing of acquiring a diffusion state of a second reflected light generated by the specific light source irradiating the target to be read with light; and generation processing of generating dedicated shading correction data dependent on the target to be read based on the diffusion state of the first reflected light, the diffusion state of the second reflected light, and the general shading correction data.

Moreover, the invention of the present application can also be implemented by a non-volatile computer-readable recording medium storing the image reading control program (computer program).

Advantageous Effects of Invention

The invention of the present application enables to efficiently perform shading correction flexibly corresponding to variations in diffusion characteristics of reflected light on a surface of a target to be read when reading an image from the target to be read.

BRIEF DESCRIPTION OF DRAWINGS

FIG. 2 is a diagram illustrating a physical structure of an image scanner 1 including the image reading device 10 according to the first example embodiment of the invention of the present application.

FIGS. 3A and 3B are diagrams illustrating a physical structure of light source module 11 according to the first example embodiment of the present disclosure.

EXAMPLE EMBODIMENT

Hereinafter, example embodiments of the invention of the present application will be described in detail with reference to the drawings.

First Example Embodiment

Figure 1:
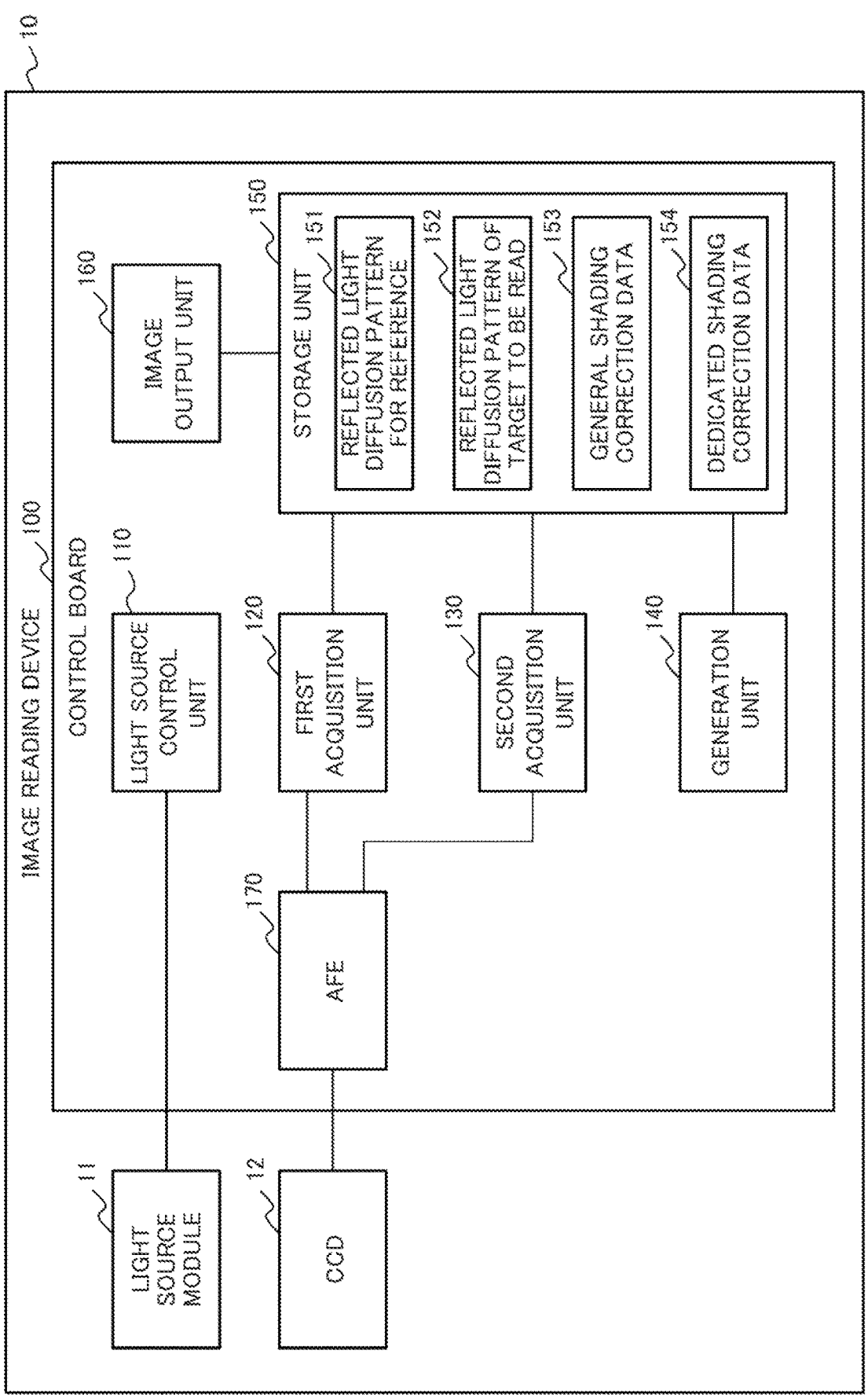
FIG. 1 is a block diagram illustrating a configuration of an image reading device 10 according to a first example embodiment of the invention of the present application.

FIG. 1 is a block diagram illustrating a configuration of an image reading device 10 according to a first example embodiment of the invention of the present application. FIG. 2 is a diagram illustrating a physical structure of an image scanner 1 including the image reading device 10 according to the present example embodiment. The following description will be given appropriately illustrating a three-dimensional (X-Y-Z) coordinate space in the drawings for convenience of description. FIG. 2 is a YZ plane view of the image scanner 1 as viewed in an X-axis positive direction.

As illustrated in FIG. 2, the image reading device 10 according to the present example embodiment has a function to read an image of a target to be read 20 conveyed in a Y-axis positive direction in the image scanner 1. The image reading device 10 includes a control board 100, a light source module 11, a charge-coupled device (CCD) 12, a lens 13, two mirrors 14, and a cover glass 15. Note that the light source module 11 may be disposed outside the image reading device 10.

The control board 100 has a function to control an overall operation of the image reading device 10, and controls the light source module 11 and the CCD 12. Details of the control board 100 will be described below with reference to FIG. 1.

When the light source module 11 irradiates the target to be read 20 with light, reflected light generated on a surface of the target to be read 20 passes through the cover glass 15 and is then input to the lens 13 via the two mirrors 14, and an image is formed on the CCD 12 by the lens 13. The image reading device 10 may not include the mirrors 14, and in this case, the reflected light passes through the cover glass 15 and is then input to the lens 13.

Further, the light source module 11, the CCD 12, the lens 13, the mirrors 14, the cover glass 15, and a reading optical path of the reflected light formed by these components have a depth in the X-axis direction. The CCD 12 is a line sensor or an area sensor, and acquires reflected light at each X coordinate value in the X-axis direction or at each XY coordinate value on the XY plane. Then, the CCD 12 inputs an analog signal representing the input reflected light to the control board 100 for each X coordinate value or each XY coordinate value.

The image scanner 1 has a shading correction function using a white reference and a black reference, and specifically, for example, a white reference plate and a black reference plate (not illustrated) are incorporated. The image reading device 10 generates general shading correction data 153 illustrated in FIG. 1 by the shading correction function. The general shading correction data 153 is shading correction data generated by a general image reading device. The image reading device 10 stores the generated general shading correction data 153 in a storage unit 150. Note that the storage unit 150 is a non-volatile storage device such as an electronic memory or a magnetic disk.

The control board 100 illustrated in FIG. 1 includes a light source control unit 110, a first acquisition unit 120, a second acquisition unit 130, a generation unit 140, a storage unit 150, an image output unit 160, and an analog front end (AFE) 170. The light source control unit 110, the first acquisition unit 120, the second acquisition unit 130, the generation unit 140, and the storage unit 150 are examples of a light source control means, a first acquisition means, a second acquisition means, a generation means, and a storage means in this order.

The light source control unit 110 controls the light source module 11. FIGS. 3A and 3B are diagrams illustrating a physical structure of the light source module 11 according to the present example embodiment. The light source module 11 includes an LED substrate 111, a plurality of LED elements 112, and diffusion plate 113. The LED substrate 111 is a printed board on which a transmission path for a control signal from the light source control unit 110 to the LED element 112 is wired. The plurality of LED elements 112 is arranged side by side in the X-axis direction on the LED substrate 111. A light emitting element included in light source module 11 is not limited to LED element 112, and light source module 11 may include a light emitting element different from LED element 112. The target to be read 20 illustrated in FIG. 2 is irradiated with light from the LED element 112 via the diffusion plate 113.

The light source control unit 110 may control a light amount of the LED element 112 by, for example, pulse width modulation (PWM) control or current value control.

The light source module 11 may use one LED element 112 as a lighting control unit as illustrated in FIG. 3A, or may use a plurality of LED elements 112 as a lighting control unit as illustrated in FIG. 3B. The light source module 11 illustrated in FIG. 3B uses three LED elements 112 as the lighting control unit, but the number of LED elements 112 per lighting control unit when the plurality of LED elements 112 is used as the lighting control unit is not limited to three.

The light source control unit 110 illustrated in FIG. 1 performs lighting control of the LED elements 112 for each lighting control unit of the LED elements 112. That is, in the example illustrated in FIG. 3A, the light source control unit 110 can cause only specific one LED element 112 included in light source module 11 to emit light, and in the example illustrated in FIG. 3B, the light source control unit 110 can cause only specific three LED elements 112 included in the light source module 11 to emit light.

The light source control unit 110 turns on all the LED elements 112 of the light source module 11 in the process in which the image reading device 10 generates the general shading correction data 153. The light source control unit 110 turns on the specific LED element 112 as the lighting control unit in the process in which the image reading device 10 acquires a reflected light diffusion pattern 151 for reference and a reflected light diffusion pattern 152 of the target to be read, which are to be described below.

The AFE 170 illustrated in FIG. 1 converts an analog signal representing the reflected light input from the CCD 12 into a digital signal, and inputs the digital signal to the first acquisition unit 120 and the second acquisition unit 130.

The first acquisition unit 120 acquires a signal representing reflected light (also referred to as first reflected light) generated when the specific LED element 112 is turned on by the light source control unit 110 via the CCD 12 and the AFE 170 in a state where image reading using the white reference and the black reference is set in the image scanner 1 (that is, a state in which the general shading correction data 153 is generated). The first acquisition unit 120 acquires the signal for each X coordinate value as the reflected light diffusion pattern 151 for reference (also referred to as a diffusion state of the first reflected light).

Figure 4:
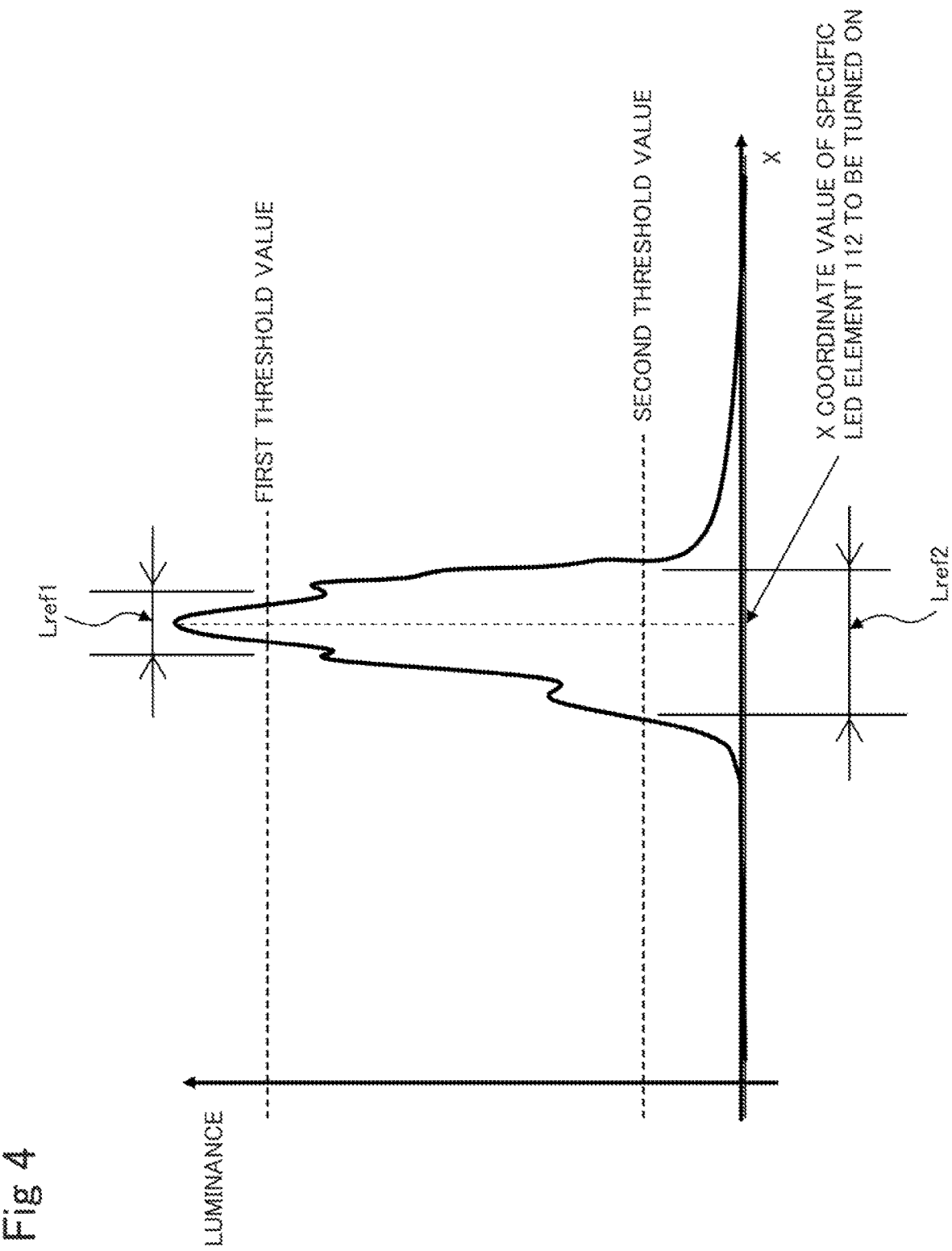
FIG. 4 is a graph illustrating a reflected light diffusion pattern 151 for reference according to the first example embodiment of the invention of the present application.

FIG. 4 is a graph illustrating a reflected light diffusion pattern 151 for reference according to the present example embodiment. In the graph illustrated in FIG. 4, the horizontal axis represents the X coordinate value at which the CCD 12 acquires the reflected light, and the vertical axis represents the luminance of the reflected light acquired by the CCD 12. In this graph, the X coordinate value at which the luminance of the reflected light is maximized corresponds to the X coordinate value at which the specific LED element 112 to be turned on is located. Since the reflected light is diffused on a reflecting surface, the graph representing the reflected light diffusion pattern 151 shows a mountain shape as exemplified in FIG. 4.

The first acquisition unit 120 stores the acquired reflected light diffusion pattern 151 for reference in the storage unit 150.

The second acquisition unit 130 illustrated in FIG. 1 acquires a signal representing reflected light (also referred to as second reflected light) generated when the specific LED element 112 is turned on by the light source control unit 110 via the CCD 12 and the AFE 170 in a state where the target to be read 20 for reading an image is installed in the image scanner 1. The second acquisition unit 130 acquires the signal for each X coordinate value as the reflected light diffusion pattern 152 of the target to be read (also referred to as a diffusion state of the second reflected light).

Figure 5:
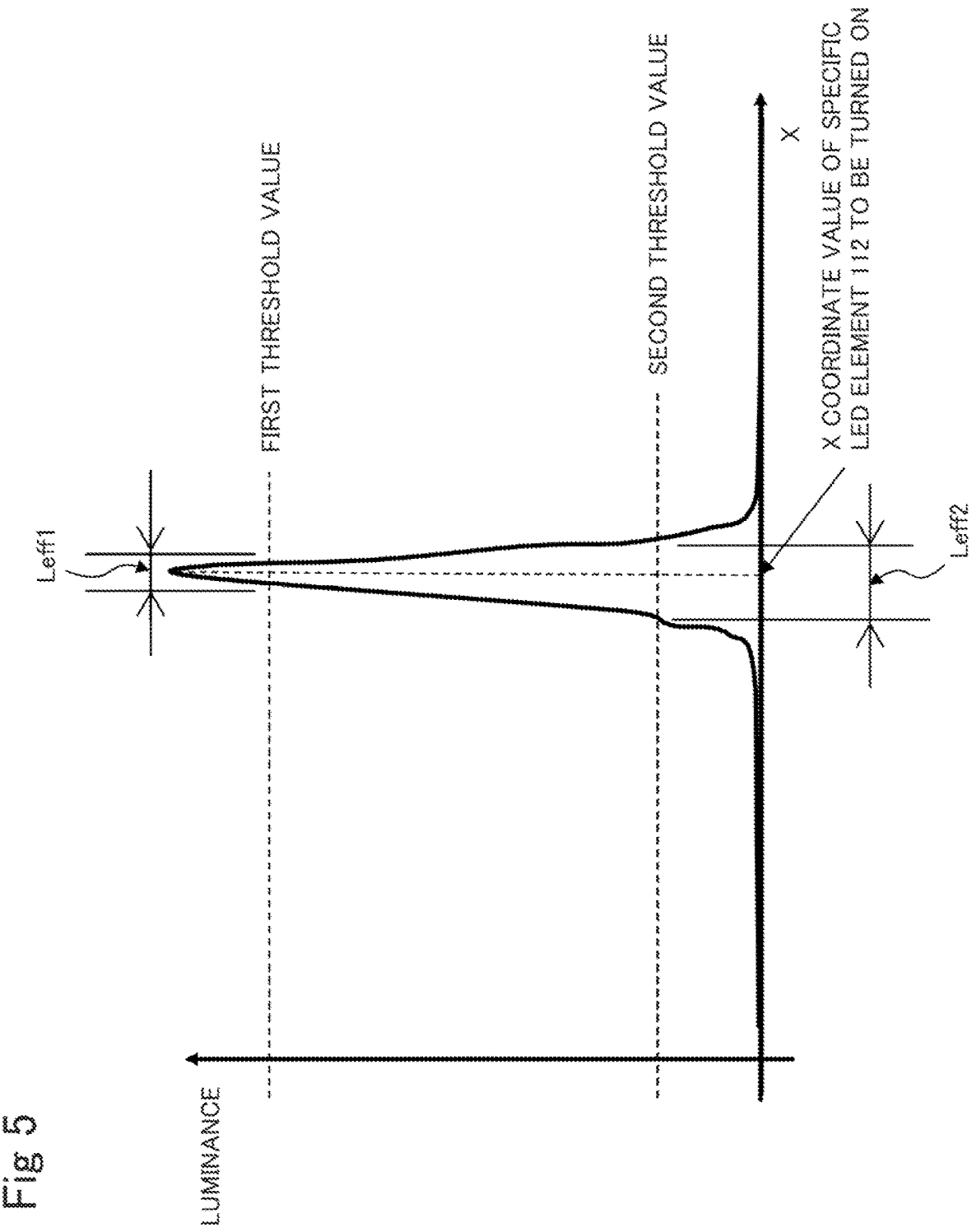
FIG. 5 is a graph illustrating a reflected light diffusion pattern 152 of a target to be read according to the first example embodiment of the invention of the present application.

FIG. 5 is a graph illustrating the reflected light diffusion pattern 152 of the target to be read according to the present example embodiment. The horizontal axis and the vertical axis in the graph illustrated in FIG. 5 are as described above with respect to FIG. 4. In this graph, the X coordinate value at which the luminance of the reflected light is maximized is as described above with reference to FIG. 4. Since the reflected light is diffused on the reflecting surface (the surface of the target to be read 20), the graph representing the reflected light diffusion pattern 152 also shows the shape of a mountain as illustrated in FIG. 5, similarly to the graph representing the reflected light diffusion pattern 151 illustrated in FIG. 4.

The second acquisition unit 130 stores the acquired reflected light diffusion pattern 152 of the target to be read in the storage unit 150.

The generation unit 140 illustrated in FIG. 1 generates dedicated shading correction data 154 on the basis of the reflected light diffusion pattern 151 for reference, the reflected light diffusion pattern 152 of the target to be read, and the general shading correction data 153 stored in the storage unit 150. The general shading correction data 153 is shading correction data not dependent on reflection characteristics of light of the target to be read 20 (diffusion characteristics of the reflected light), and the dedicated shading correction data 154 is shading correction data dependent on the target to be read 20 and reflecting the reflection characteristics of light of the target to be read 20 (diffusion characteristics of the reflected light).

The generation unit 140 normalizes the reflected light diffusion pattern 151 for reference illustrated in FIG. 4 so that a maximum value of the luminance of the reflected light acquired by the CCD 12 becomes "1". In the normalized reflected light diffusion pattern 151 for reference, the generation unit 140 obtains Lref1 representing a width of a range of the X coordinate value in which the luminance of the reflected light acquired by the CCD 12 becomes equal to or larger than a first threshold value. Similarly, in the normalized reflected light diffusion pattern 151 for reference, the generation unit 140 obtains Lref2 representing a width of a range of the X coordinate value in which the luminance of the reflected light acquired by the CCD 12 becomes equal to or larger than a second threshold value. Note that the second threshold value is smaller than the first threshold value.

The generation unit 140 normalizes the reflected light diffusion pattern 152 of the target to be read illustrated in FIG. 5 so that a maximum value of the luminance of the reflected light acquired by the CCD 12 becomes "1". In the normalized reflected light diffusion pattern 152 of the target to be read, the generation unit 140 obtains Leff1 representing a width of a range of the X coordinate value in which the luminance of the reflected light acquired by the CCD 12 becomes equal to or larger than the first threshold value. Similarly, in the normalized reflected light diffusion pattern 152 of the target to be read, the generation unit 140 obtains Leff2 representing a width of a range of the X coordinate value in which the luminance of the reflected light acquired by the CCD 12 becomes equal to or larger than the second threshold value.

Using Lref1, Lref2, Leff1, and Leff2 obtained as described above, the generation unit 140 calculates a correction value γeff for the general shading correction data 153, for example, as illustrated in Expression 1.

$$\gamma\text{eff} = \{(Lref1/Lref2) - (Leff1/Leff2)\}*T \quad \text{(Expression 1)}$$

In Expression 1, "/" is an operator representing division, "−" is an operator representing subtraction, and "*" is an operator representing multiplication. "T" in Expression 1 is a predetermined coefficient.

In Expression 1, (Lref1/Lref2) represents the degree of diffusion (also referred to as diffusivity) of the reflected light in the reflected light diffusion pattern 151 for reference, and is also referred to as a first ratio. Furthermore, (Leff1/Leff2) represents the degree of diffusion of the reflected light in the reflected light diffusion pattern 152 of the target to be read, and is also referred to as a second ratio. (Lref1/Lref2) and (Leff1/Leff2) indicate that the closer the value is to "1" (the smaller the degree of spread of the mountain illustrated by the graph), the smaller the diffusivity, and the closer the value is to "0" (the larger the degree of spread of the mountain illustrated by the graph), the larger the diffusivity.

In the examples illustrated in FIGS. 4 and 5, the diffusivity of the reflected light in the reflected light diffusion pattern 152 of the target to be read is smaller than the diffusivity of the reflected light in the reflected light diffusion pattern 151 for reference. This indicates that the surface of the target to be read 20 has a smaller diffusivity than the reflective surface when an image is read using the white reference and the black reference (that is, the surface of the target to be read is closer to a mirror surface, and the contrast of the image represented by the reflected light is large).

From the above description, the correction value γeff expressed by Expression 1 represents a difference between the diffusivity (first ratio) of the reflected light on the reflective surface and the diffusivity (second ratio) of the reflected light on the surface of the target to be read 20 when image reading is performed using the white reference and the black reference. The generation unit 140 generates the dedicated shading correction data 154 by performing a predetermined operation using the correction value γeff for the general shading correction data 153.

Various operations can be considered as the operation performed for the general shading correction data 153 by the generation unit 140. For example, in a case where the general shading correction data 153 represents a correction value of the luminance of the reflected light with respect to the X coordinate value (a value for performing four arithmetic operations or the like for an observation value of the luminance), the generation unit 140 adjusts the correction value of the luminance in the general shading correction data 153 on the basis of the correction value γeff.

In the examples illustrated in FIGS. 4 and 5, the general shading correction data 153 is data generated on the assumption that the diffusivity on the surface is larger than that of the target to be read 20 (the contrast of the image represented by the reflected light is small). Therefore, the generation unit 140 generates the dedicated shading correction data 154 with the adjusted correction value of the luminance of the reflected light so as to suppress the contrast more than the general shading correction data 153 (so as not to emphasize the contrast excessively by the shading correction).

Alternatively, contrary to the examples illustrated in FIGS. 4 and 5, in a case where the general shading correction data 153 is data generated on the assumption that the diffusivity on the surface is smaller than that of the target to be read 20 (the contrast of the image represented by the reflected light is large), the generation unit 140 generates the dedicated shading correction data 154 with the adjusted correction value of the luminance of the reflected light so as to emphasize the contrast more than the general shading correction data 153 (so as not to suppress the contrast excessively by the shading correction).

More specifically, for example, the generation unit 140 generates the dedicated shading correction data 154 using Seff(x) calculated by Expression 3 in which the value of γeff is applied to a sigmoid function expressed in Expression 2.

$$\text{sigmoid}(x) = 1/\{1 + e^{\wedge}(-a*x)\} \quad \text{(Expression 2)}$$

In Expression 2, e represents a base of a natural logarithm, a represents a gain in the sigmoid function, and ʌ represents an operator representing a power.

$$Seff(x) = 1/[1 + e^{\wedge}\{-\gamma\text{eff}*(x - (L1+L2)/2)\}] \quad \text{(Expression 3)}$$

In Expression 3, Seff(x) represents the shading correction coefficient (applied to contrast adjustment) at a gradation value (luminance) x, and L1 and L2 represent the first and second threshold values regarding the luminance of the reflected light described above.

In a case where the value of γeff is a negative value, the generation unit 140 calculates Seff(x) by applying an absolute value of γeff to an inverse function of Expression 3.

The generation unit 140 may also obtain an optimum value of γeff by performing calculation a plurality of times while adjusting the coefficient T in Expression 1.

In addition, the numerical expression used when the generation unit 140 obtains the correction value γeff for the general shading correction data 153 is not limited to Expression 1. The generation unit 140 may obtain the correction value γeff using a numerical expression different from Expression 1.

The generation unit 140 stores the generated dedicated shading correction data 154 in the storage unit 150.

The image output unit 160 illustrated in FIG. 1 performs the shading correction for the image of the target to be read 20 read in the state where the light source control unit 110 has turned on all the LED elements 112, using the dedicated shading correction data 154, and outputs a result of the shading correction to the outside as a read image by the image scanner 1.

Next, operation (processing) of the image reading device 10 according to the present example embodiment will be described in detail with reference to flowcharts of FIGS. 6 and 7.

Figure 6:
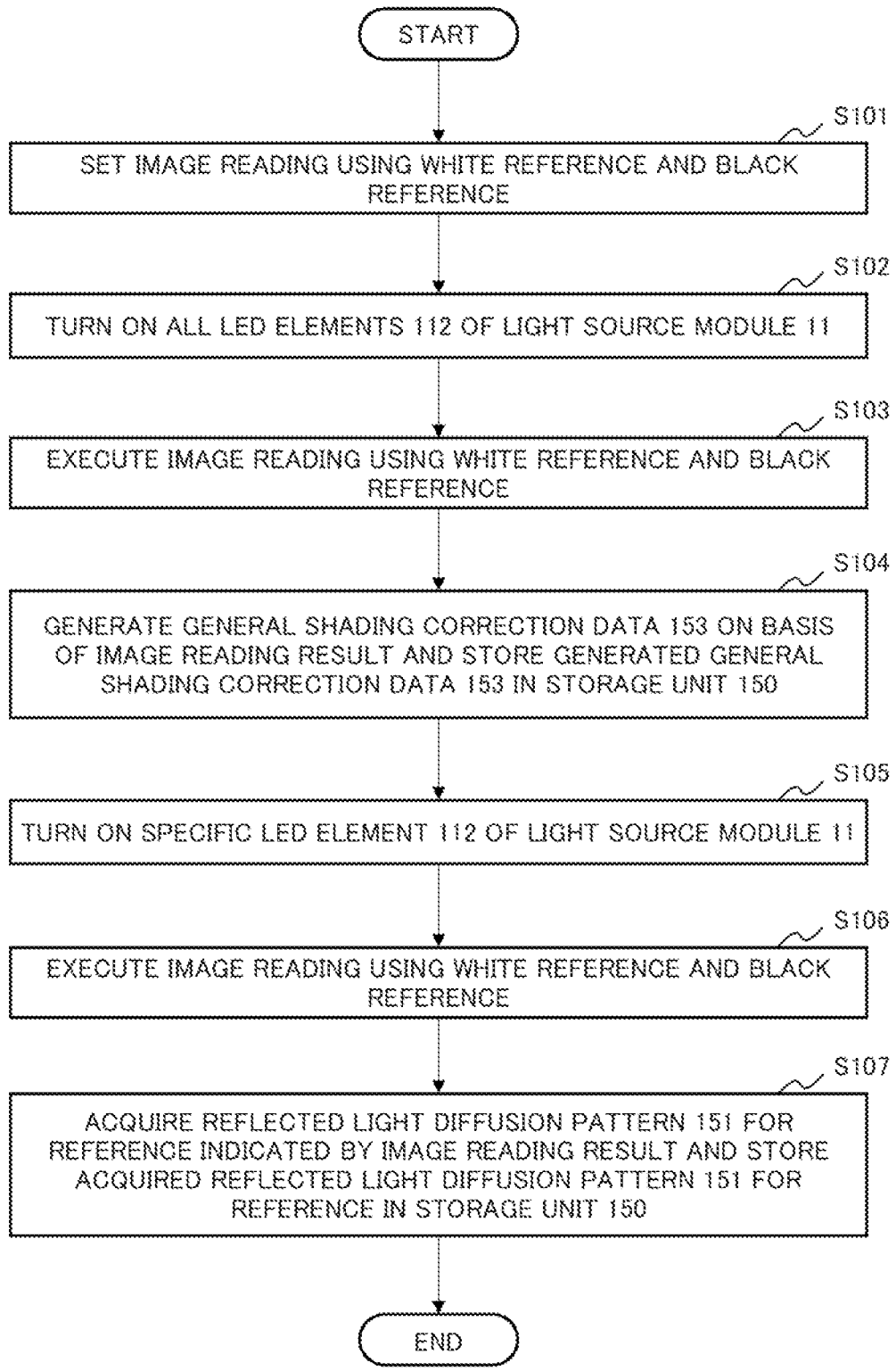
FIG. 6 is a flowchart illustrating an operation in which the image reading device 10 according to the first example embodiment of the invention of the present application acquires general shading correction data 153 and reflected light diffusion pattern 151 for reference.

FIG. 6 is a flowchart illustrating an operation in which the image reading device 10 acquires general shading correction data 153 and reflected light diffusion pattern 151 for reference.

The image reading device 10 sets image reading using the white reference and the black reference in the image scanner 1 (step S101). The light source control unit 110 turns on all the LED elements 112 of the light source module 11 (step S102). The image reading device 10 executes image reading using the white reference and the black reference (step S103). The image reading device 10 generates the general shading correction data 153 on the basis of an image reading result, and stores the generated general shading correction data 153 in the storage unit 150 (step S104).

The light source control unit 110 turns on the specific LED element 112 of the light source module 11 (step S105). The image reading device 10 executes image reading using the white reference and the black reference (step S106). The first acquisition unit 120 acquires the reflected light diffusion pattern 151 for reference indicated by the image reading result, stores the acquired reflected light diffusion pattern 151 for reference in the storage unit 150 (step S107), and terminates the entire processing.

Figure 7:
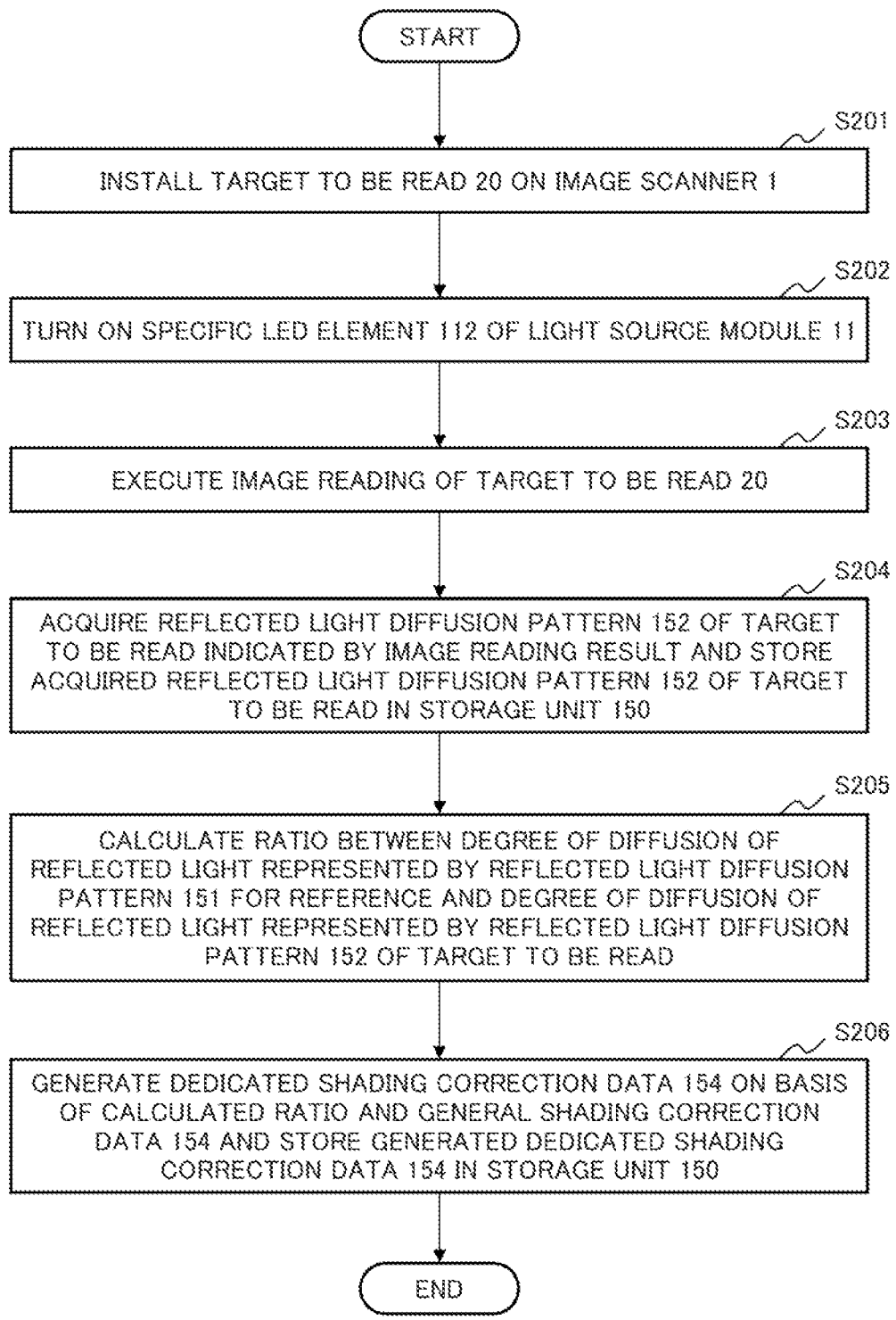
FIG. 7 is a flowchart illustrating an operation in which the image reading device 10 according to the first example embodiment of the invention of the present application generates dedicated shading correction data 154.

FIG. 7 is a flowchart illustrating an operation in which the image reading device 10 generates the dedicated shading correction data 154.

The target to be read 20 is installed in the image scanner 1 (step S201). The light source control unit 110 turns on the specific LED element 112 of the light source module 11 (step S202). The image reading device 10 reads an image of the target to be read 20 (step S203). The second acquisition unit 130 acquires the reflected light diffusion pattern 152 of the target to be read indicated by the reading result of the image, and stores the acquired reflected light diffusion pattern 152 of the target to be read in the storage unit 150 (step S204).

The generation unit 140 calculates the ratio between the degree of diffusion of the reflected light represented by the reflected light diffusion pattern 151 for reference and the degree of diffusion of the reflected light represented by the reflected light diffusion pattern 152 of the target to be read (step S205). The generation unit 140 generates the dedicated shading correction data 154 on the basis of the calculated ratio and the general shading correction data 153, stores the generated dedicated shading correction data 154 in the storage unit 150 (step S206), and terminates the entire processing.

The image reading device 10 according to the present example embodiment can efficiently perform the shading correction flexibly corresponding to variations in diffusion characteristics of the reflected light on the surface of the target to be read when reading an image from the target to be read. This is because the image reading device 10 generates the dedicated shading correction data 154 obtained by correcting the general shading correction data 153 on the basis of the diffusion characteristics of the reflected light of the target to be read 20, on the basis of the reflected light diffusion pattern 151 for reference and the reflected light diffusion pattern 152 of the target to be read obtained by turning on the specific LED element 112.

Hereinafter, effects achieved by the image reading device 10 according to the present example embodiment will be described in detail.

Along with enlargement of an area where an image reading device is introduced, a cloth material, a glossy metal plate, or the like is used in addition to paper as a material of a target to be read for an image. Since the material such as a cloth material or a metal plate greatly differs from paper in diffusion characteristics of reflected light on a surface thereof, it is difficult to appropriately perform shading correction by a general shading correction method. That is, in a case where various materials are used as the material of the target to be read for an image, there is a problem of efficiently performing shading correction that flexibly copes with variations in the diffusion characteristics of reflected light on the surface of the target to be read.

To solve such a problem, the image reading device 10 according to the present example embodiment includes the light source control unit 110, the first acquisition unit 120, the second acquisition unit 130, and the generation unit 140, and operates as described above with reference to FIGS. 1 to 7, for example. That is, the light source control unit 110 controls the plurality of LED elements 112 so as to turn on only the specific LED element 112 among the plurality of LED elements 112 (light sources). In the state of generating the general shading correction data 153 not dependent on the target to be read 20 for an image, the first acquisition unit 120 acquires the reflected light diffusion pattern 151 for reference representing the diffusion state of the first reflected light generated by turning on the specific LED element 112. The second acquisition unit 130 acquires the reflected light diffusion pattern 152 of the target to be read representing the diffusion state of the second reflected light generated by irradiating the target to be read 20 with light by the specific LED element 112. Then, the generation unit 140 generates the dedicated shading correction data 154 dependent on the target to be read 20 on the basis of the reflected light diffusion pattern 151 for reference, the reflected light diffusion pattern 152 of the target to be read, and the general shading correction data 153.

That is, the image reading device 10 according to the present example embodiment can acquire the data in which the relationship between the X coordinate value of the CCD 12 and the luminance of the reflected light shows the shape of one mountain as illustrated in FIG. 4 or 5, for example, by turning on only the specific (some) LED elements 112 included in the light source module 11. The image reading device 10 acquires the above-described data indicating the shape of a mountain at the time of reading an image using the white reference and the black reference and at the time of reading an image of the target to be read 20, and obtains the difference between the diffusivity of the reflected light at the time of reading the image using the white reference and the black reference and the diffusivity of the reflected light at the time of reading the image of the target to be read 20 on the basis of the ratio of the degrees of spread of the two mountains. Then, the image reading device 10 generates the dedicated shading correction data 154 based on the diffusion characteristics of the reflected light of the target to be read 20 from the general shading correction data 153 on the basis of the obtained difference. Therefore, by performing such simple processing, the image reading device 10 can efficiently perform the shading correction flexibly corresponding to the variations in the diffusion characteristics of the reflected light on the surface of the target to be read.

Furthermore, the light source control unit 110 according to the present example embodiment may execute turning on only the specific LED element 112 a plurality of times while changing the specific LED element 112 selected from the plurality of LED elements 112. In this case, the first acquisition unit 120 acquires the reflected light diffusion pattern 151 for reference in each of the plurality of times. The second acquisition unit 130 acquires the reflected light diffusion pattern 152 of the target to be read in each of the plurality of times. Then, the generation unit 140 generates the dedicated shading correction data 154 on the basis of the reflected light diffusion pattern 151 for reference and the reflected light diffusion pattern 152 of the target to be read for each of the plurality of times. By performing such processing, the image reading device 10 uses a plurality of pieces of data as illustrated in FIGS. 4 and 5 in which the X coordinate values of the specific LED elements 112 to be turned on are different, thereby generating the dedicated shading correction data 154 reflecting the diffusion characteristics of the reflected light on the surface of the target to be read with high accuracy.

Second Example Embodiment

Figure 8:
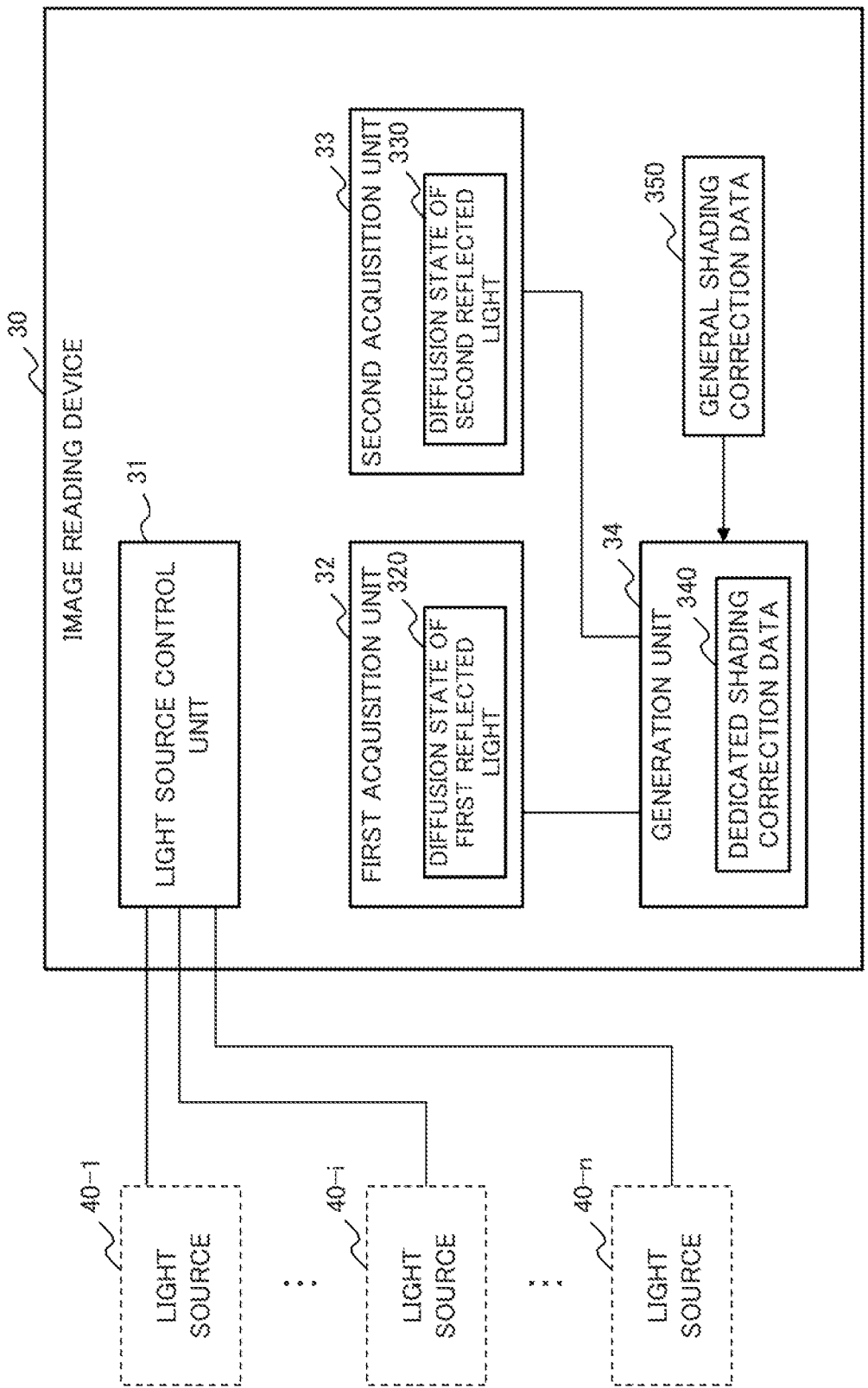
FIG. 8 is a block diagram illustrating a configuration of an image reading device 30 according to a second example embodiment of the invention of the present application.

FIG. 8 is a block diagram illustrating a configuration of an image reading device 30 according to a second example embodiment of the invention of the present application.

The image reading device 30 according to the present example embodiment includes a light source control unit 31, a first acquisition unit 32, a second acquisition unit 33, and a generation unit 34. The light source control unit 31, the first acquisition unit 32, the second acquisition unit 33, and the generation unit 34 are examples of a light source control means, a first acquisition means, a second acquisition means, and a generation means in this order.

The light source control unit 31 controls a plurality of light sources 40-1 to 40-$n$ so as to turn on only a specific light source 40-$i$ (i is at least one integer of 1 to n) among a plurality of light sources 40-1 to 40-$n$ (n is an arbitrary integer of equal to or larger than 2). The plurality of light sources 40-1 to 40-$n$ is, for example, light sources such as the LED elements 112 included in the light source module 11 according to the first example embodiment.

The first acquisition unit 32 acquires a diffusion state 320 of first reflected light generated by turning on the specific light source 40-$i$ in a state of generating general shading correction data 350 not dependent on a target to be read for an image. The general shading correction data 350 is, for example, data such as the general shading correction data 153 according to the first example embodiment. The diffusion state 320 of the first reflected light is, for example, data such as the reflected light diffusion pattern 151 for reference according to the first example embodiment illustrated in FIG. 4.

The second acquisition unit 33 acquires a diffusion state 330 of second reflected light generated by irradiating the target to be read with light from the specific light source 40-$i$. The diffusion state 330 of the second reflected light is, for example, data such as the reflected light diffusion pattern 152 of the target to be read according to the first example embodiment illustrated in FIG. 5.

The generation unit 34 generates dedicated shading correction data 340 dependent on the target to be read on the basis of the diffusion state 320 of the first reflected light, the diffusion state 330 of the second reflected light, and the general shading correction data 350. For example, the generation unit 34 may generate the dedicated shading correction data 154 by a procedure similar to the procedure in which the generation unit 140 according to the first example embodiment generates the dedicated shading correction data 340 by performing a predetermined operation using the correction value γeff.

The image reading device 30 according to the present example embodiment can efficiently perform the shading correction flexibly corresponding to variations in diffusion characteristics of the reflected light on the surface of the target to be read when reading an image from the target to be read. This is because the image reading device 30 generates the dedicated shading correction data 340 obtained by correcting the general shading correction data 350 on the basis of the diffusion characteristics of the reflected light of the target to be read, on the basis of the diffusion state 320 of the first reflected light and the diffusion state 330 of the second reflected light obtained by turning on the specific light source 40-$i$.

<Hardware Configuration Example>

The units in the image reading devices illustrated in FIGS. 1 and 8 in the above-described example embodiments can be implemented by dedicated hardware (HW) (electronic circuit). Further, in FIGS. 1 and 8, at least the following configurations can be regarded as function (processing) units (software modules) of a software program including instructions executed by a processor:

the light source control units 110 and 31,
the first acquisition unit 120 and the first acquisition unit 32,
the second acquisition unit 130 and the second acquisition unit 33,
the generation units 140 and 34,
the storage control function in the storage unit 150, and
the image output unit 160.

Note that the division of the units illustrated in these drawings is a configuration for convenience of description, and various configurations can be assumed at the time of implementation. An example of a hardware environment in this case will be described with reference to FIG. 9.

Figure 9:
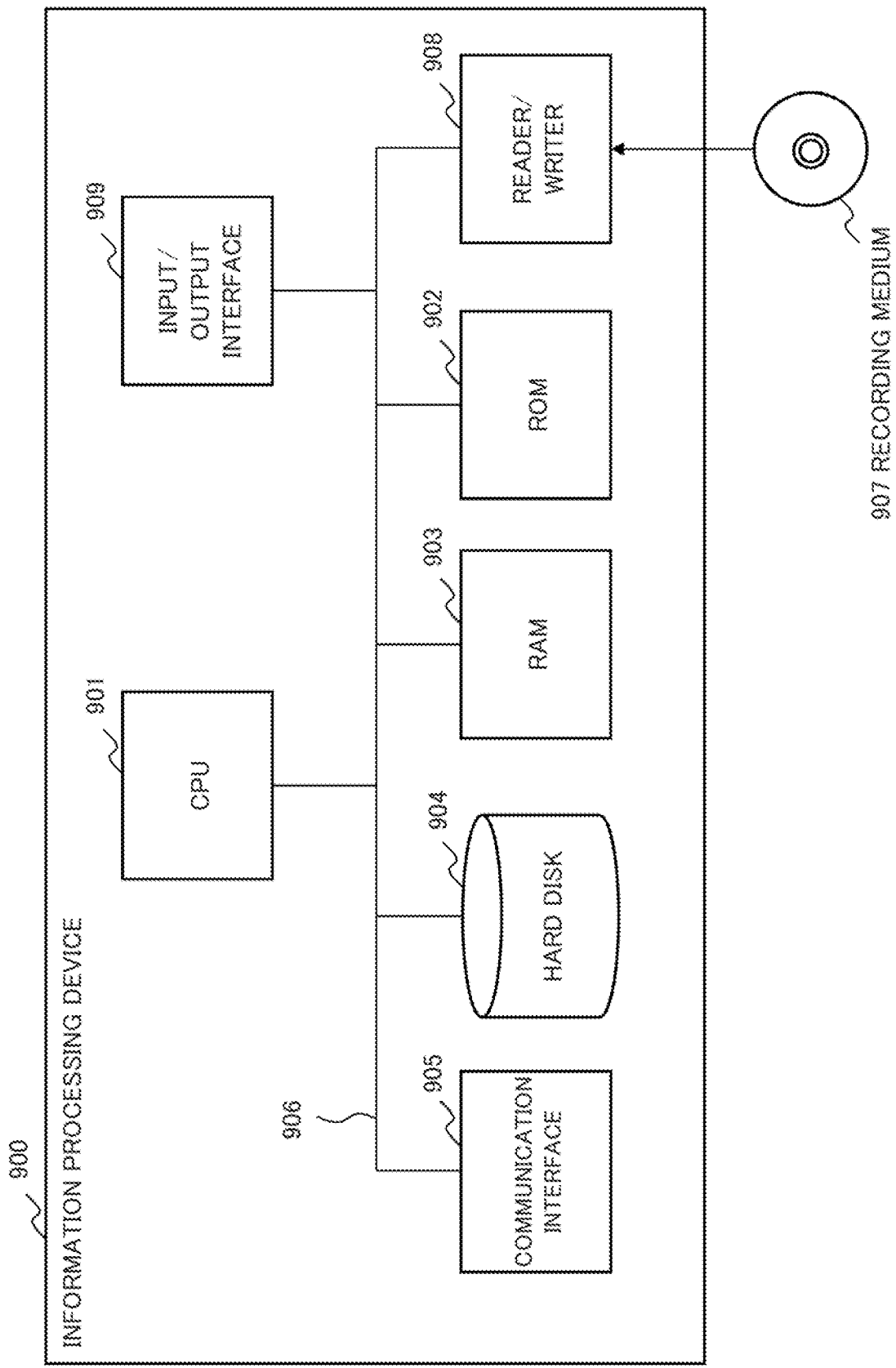
FIG. 9 is a block diagram illustrating a configuration of an information processing device 900 capable of executing the image reading device according to each example embodiment of the invention of the present application.
Figure 10A:
FIGS. 10A and 10B are diagrams illustrating a read image in a case where shading correction is not performed and a read image in a case where shading correction is performed.
Figure 10B:
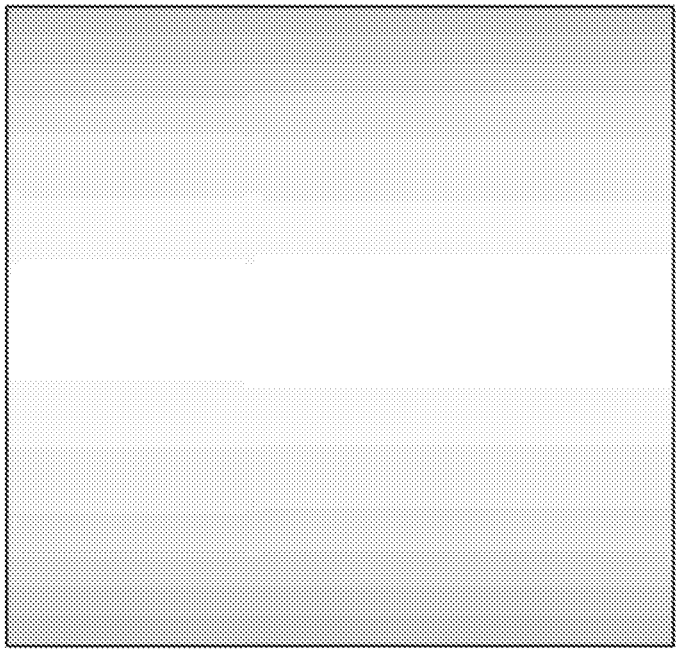

FIG. 9 is a diagram for exemplarily describing a configuration of an information processing device 900 (computer) capable of implementing the image reading device according to each example embodiment of the invention of the present application. That is, FIG. 9 illustrates a configuration of a computer (information processing device) capable of implementing the image reading devices illustrated in FIGS. 1 and 8, and represents a hardware environment capable of implementing each function in the above-described example embodiments.

The information processing device 900 illustrated in FIG. 9 includes the following components as constituent elements:

a central processing unit (CPU) 901,
a read only memory (ROM) 902,
a random access memory (RAM) 903,
a hard disk (storage device) 904,
a communication interface 905,
a bus 906 (communication line),
a reader/writer 908 capable of reading and writing data stored in a recording medium 907 such as a compact disc read only memory (CD-ROM), and an input/output interface 909 such as a monitor, a speaker, and a keyboard.

That is, the information processing device 900 including the above-described components is a general computer to which these components are connected via the bus 906. The information processing device 900 may include a plurality of the CPUs 901 or may include the CPU 901 configured by multiple cores.

Then, the invention of the present application described using the above-described example embodiments as examples supplies a computer program capable of implementing the following functions to the information processing device 900 illustrated in FIG. 9. The functions are the above-described configurations in the block configuration diagrams (FIGS. 1 and 8) referred to in the description of the example embodiments or the functions of the flowcharts (FIGS. 6 and 7). Thereafter, the invention of the present application is achieved by reading the computer program to the CPU 901 of the hardware and interpreting and executing the computer program. Further, the computer program supplied to the device may be stored in a readable/writable volatile memory (RAM 903) or a non-volatile storage device such as the ROM 902 or the hard disk 904.

Further, in the above case, a general procedure can be adopted at present as a method of supplying the computer program to the hardware. Examples of the procedure include a method of installing the program in the device via various recording media 907 such as a CD-ROM, a method of downloading the program from the outside via a communication line such as the Internet, and the like. In such a case, the invention of the present application can be regarded as being configured by a code constituting the computer program or by the recording medium 907 storing the code.

The invention of the present application has been described with reference to the above-described example embodiments as exemplary examples. However, the invention of the present application is not limited to the above-described example embodiments. That is, various aspects that will be understood by those of ordinary skill in the art can be applied without departing from the scope of the invention of the present application as defined by the claims.

This application is based upon and claims the benefit of priority from Japanese patent application No. 2019-235443, filed on Dec. 26, 2019, the disclosure of which is incorporated herein in its entirety by reference.

REFERENCE SIGNS LIST 1 image scanner
10 image reading device
100 control board
110 light source control unit
111 LED substrate
112 LED element
113 diffusion plate
120 first acquisition unit
130 second acquisition unit
140 generation unit
150 storage unit
151 reflected light diffusion pattern for reference
152 reflected light diffusion pattern of target to be read
153 general shading correction data
154 dedicated shading correction data
160 image output unit
170 AFE
11 light source module
12 CCD
13 lens
14 mirror
15 cover glass
20 target to be read
30 image reading device
31 light source control unit
32 first acquisition unit
320 diffusion state of first reflected light
33 second acquisition unit
330 diffusion state of second reflected light
34 generation unit
340 dedicated shading correction data
350 general shading correction data
40-1 to 40n light source
900 information processing device
901 CPU
902 ROM
903 RAM
904 hard disk (storage device)
905 communication interface
906 bus
907 recording medium
908 reader/writer
909 input/output interface

What is claimed is:

1. An image reading device comprising:
at least one memory storing a computer program; and
at least one processor configured to execute the computer program to:
control a plurality of light sources in such a way as to turn on only a specific light source among the plurality of light sources;
acquire a diffusion state of a first reflected light generated by turning on of the specific light source, as a luminance of the first reflected light with respect to a position for acquiring the first reflected light, in a state where general shading correction data not dependent on a target to be read for an image is generated;
acquire a diffusion state of a second reflected light generated by the specific light source irradiating the target to be read with light, as a luminance of the second reflected light with respect to a position for acquiring the second reflected light;
calculate a first ratio between a width of a range, regarding the position for acquiring the first reflected light, in which the luminance of the first reflected light is equal to or larger than a first threshold value, and a width of a range, regarding the position for acquiring the first reflected light, in which the luminance of the first reflected light is equal to or larger than a second threshold value smaller than the first threshold value,
calculate a second ratio between a width of a range, regarding the position for acquiring the second reflected light, in which the luminance of the second reflected light is equal to or larger than the first threshold value, and a width of a range, regarding the position for acquiring the second reflected light, in which the luminance of the second reflected light is equal to or larger than the second threshold value, and
generate dedicated shading correction data dependent on the target to be read based on the diffusion state of the first reflected light, the diffusion state of the second reflected light, a difference between the first ratio and the second ratio, and the general shading correction data.

2. The image reading device according to claim 1, wherein the processor is configured to execute the computer program to
    execute the turning on of only the specific light source while changing the specific light source selected from the plurality of light sources a plurality of times,
    acquire the diffusion state of the first reflected light in each of the plurality of times,
    acquire the diffusion state of the second reflected light in each of the plurality of times, and
    generate the dedicated shading correction data based on the diffusion state of the first reflected light and the diffusion state of the second reflected light in each of the plurality of times.

3. The image reading device according to claim 1, wherein the processor is configured to execute the computer program to
    control one or more predetermined number of light emitting elements as the specific light source.

4. The image reading device according to claim 1, further comprising:
    a storage configured to store the diffusion state of the first reflected light, the diffusion state of the second reflected light, the general shading correction data, and the dedicated shading correction data.

5. The image reading device according to claim 1, wherein the processor is configured to execute the computer program to
    acquire the diffusion state of the first reflected light by using a white reference and a black reference.

6. The image reading device according to claim 1, further comprising:
    the plurality of light sources; and
    an element configured to convert the first reflected light and the second reflected light into an electrical signal.

7. An image reading control method comprising:
    by an information processing device,
    controlling a plurality of light sources in such a way as to turn on only a specific light source among the plurality of light sources;
    acquiring a diffusion state of a first reflected light generated by turning on of the specific light source, as a luminance of the first reflected light with respect to a position for acquiring the first reflected light, in a state where general shading correction data not dependent on a target to be read for an image is generated;
    acquiring a diffusion state of a second reflected light generated by the specific light source irradiating the target to be read with light, as a luminance of the second reflected light with respect to a position for acquiring the second reflected light;
    calculating a first ratio between a width of a range, regarding the position for acquiring the first reflected light, in which the luminance of the first reflected light is equal to or larger than a first threshold value, and a width of a range, regarding the position for acquiring the first reflected light, in which the luminance of the first reflected light is equal to or larger than a second threshold value smaller than the first threshold value;
    calculating a second ratio between a width of a range, regarding the position for acquiring the second reflected light, in which the luminance of the second reflected light is equal to or larger than the first threshold value, and a width of a range, regarding the position for acquiring the second reflected light, in which the luminance of the second reflected light is equal to or larger than the second threshold value; and
    generating dedicated shading correction data dependent on the target to be read based on the diffusion state of the first reflected light, the diffusion state of the second reflected light, a difference between the first ratio and the second ratio and the general shading correction data.

8. A non-transitory computer-readable recording medium storing an image reading control program for causing a computer to execute:
    light source control processing of controlling a plurality of light sources in such a way as to turn on only a specific light source among the plurality of light sources;
    first acquisition processing of acquiring a diffusion state of a first reflected light generated by turning on of the specific light source, as a luminance of the first reflected light with respect to a position for acquiring the first reflected light, in a state where general shading correction data not dependent on a target to be read for an image is generated;
    second acquisition processing of acquiring a diffusion state of a second reflected light generated by the specific light source irradiating the target to be read with light, as a luminance of the second reflected light with respect to a position for acquiring the second reflected light;
    first calculation processing of calculating a first ratio between a width of a range, regarding the position for acquiring the first reflected light, in which the luminance of the first reflected light is equal to or larger than a first threshold value, and a width of a range, regarding the position for acquiring the first reflected light, in which the luminance of the first reflected light is equal to or larger than a second threshold value smaller than the first threshold value;
    second calculation processing of calculating a second ratio between a width of a range, regarding the position for acquiring the second reflected light, in which the luminance of the second reflected light is equal to or larger than the first threshold value, and a width of a range, regarding the position for acquiring the second reflected light, in which the luminance of the second reflected light is equal to or larger than the second threshold value; and
    generation processing of generating dedicated shading correction data dependent on the target to be read based on the diffusion state of the first reflected light, the diffusion state of the second reflected light, a difference between the first ratio and the second ratio and the general shading correction data.

* * * * *